Figure 1:
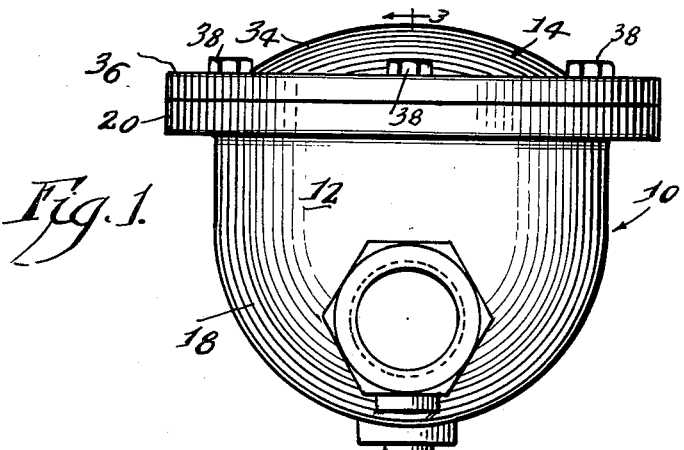

Oct. 29, 1963  J. A. SAUNDERS  3,108,866

GAS FILTER

Filed Aug. 30, 1961

Inventor.
John A. Saunders.
By Norman Gerlach
Attorney.

United States Patent Office 3,108,866
Patented Oct. 29, 1963

3,108,866
GAS FILTER
John A. Saunders, Rockford, Ill., assignor to Eclipse Fuel Engineering Co., Rockford, Ill., a corporation of Illinois
Filed Aug. 30, 1961, Ser. No. 134,906
1 Claim. (Cl. 55—480)

The improved gas filter comprising the present invention has been designed for use primarily in connection with gas service equipment wherein it serves as a medium or instrumentality for removing impurities in the form of solid or semi-solid material from illuminating gas. The invention is, however, capable of other uses and filters constructed according to the principles thereof will be found useful for removing solid or semi-solid foreign material from various kinds of gaseous substances regardless of their nature or the use to which they may be put.

The illuminating gas which flows through commercial pipe lines from the source to the various points of consumption picks up and accumulates an appreciable quantity of foreign material, such as rust, dust, scale, oxide formations, precipitates and the like. This material moves along with the stream of gas and, if not removed, tends to clog the small orifices in gas utilizing and gas control apparatus and interferes with proper functioning of the apparatus. It has been found in practice that where efficient gas filters are not employed, the presence of foreign material in the gas interferes with the flow of the gas through meters, control valves and pilot light orifices and frequently causes pilot light extinguishment in automatically controlled gas utilizing apparatus or equipment. Such pilot flame extinguishment is known in the industry as pilot outages and tends to create explosion hazards. Where gas equipment is not automatically controlled, the inconvenience which is created by orifice stoppage is great and involves considerable service expense and equipment idle time.

Present day standard or conventional gas filters which are designed to remove impurities from gas flowing through service lines are possessed of several limitations, principal among which is the fact that these filters reduce the rate of flow of the gas through the lines, especially after they have been in service for some time. Additionally, these filters depend for their effectiveness upon the use of wads of fibrous filter material and, although provision is sometimes made for replacement of these wads of filter material without disconnecting the filters from the lines, the procedure involved in replacing the wads is laborious. Furthermore, the packing of the wads into the filter chambers cannot always be performed uniformly and as the result resistance to the flow of gas through the lines results.

The present invention is designed to overcome the aforementioned limitations that are attendant upon the construction and use of conventional gas filters and, toward this end, it contemplates the provision of an improved gas filter which will completely remove suspended solids from gas flowing through a service line without materially reducing the rate of flow of the gas through the line, even after the filter has been in service for a long period of time.

The provision of a gas filter which will permit the free flow of gas therethrough as stated above being among the principal objects of the invention, it is a further object to provide a filter which utilizes a replaceable body of filter material and is so designed or constructed that replacement of the body may be effected in a simpler manner than has heretofore been possible in connection with conventional gas filters.

Another object of the invention is to provide a gas filter in which the body or filter media is in the form of a prefabricated or precut block of a spongy material which is of a porous nature and, although resilient and compressible, possesses an appreciable degree of resistance to compressional forces, contains minute interconnected air cells and, after applied deforming forces are relieved, tends to resume its original natural shape or state. By the use of such material, a block thereof may be cut by a simple shearing process, or otherwise shaped to fit the contour of the filter chamber and removably installed therein without requiring the use of a retaining screen, cage or other securing device, and without the necessity of carefully fitting the filter material in place and effecting localized internal displacement of the filter material to insure even distribution thereof throughout the filter chamber. Stated otherwise, it is an object of the invention to provide a gas filter having an internal filter chamber in which there is removably disposed a self-contained filter body in the form of a precut block of filter material, the replaceable filter body being devoid of retaining screens or other receivers which, ordinarily, hold the filter material in place and prevent particles of the material from passing through the gas line in response to forces exercised by the pressure of the gas or other fluids flowing through the line.

With these and other objects in view, which will become more readily apparent as the following description ensues, the invention consists of the novel construction, combination and arrangement of parts shown in the accompanying single sheet of drawings forming a part of this specification.

Figure 2:
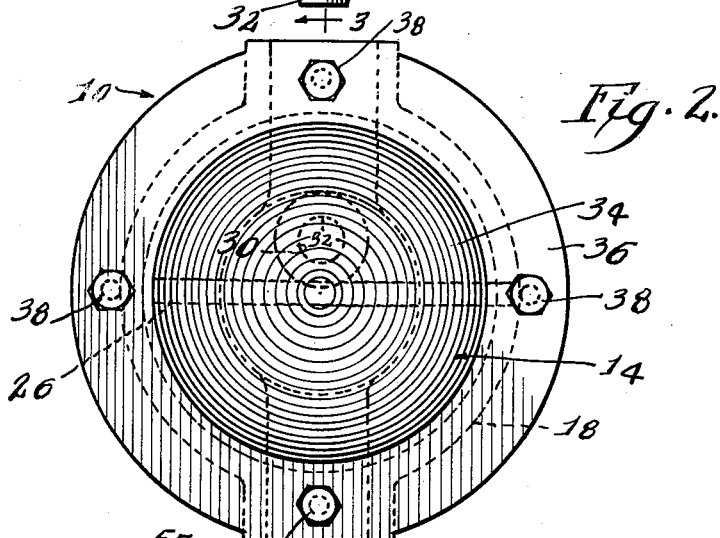

In these drawings:
FIG. 1 is an end elevational view of a gas filter embodying the principles of the present invention;
FIG. 2 is a top plan view of the filter; and
FIG. 3 is a sectional view taken on the line 3—3 of FIG. 1.

Referring now to the drawings in detail, the improved gas filter is designated in its entirety by the reference numeral 10 and consists of but three main or principal parts, namely, a casing body 12, a removable cover plate 14 and a filter body or element 16.

The casing body 12 is generally of bowl-shape design or configuration as best illustrated in FIG. 1. It is preferably in the form of a metallic casting and includes a bowl portion 18 having a circular rim flange 20 at its upper open end. Near the bottom of the bowl portion 18 there are provided diametrically opposed, internally threaded openings 22 and 24, the opening 22 providing a gas inlet for raw gas and the opening 24 providing a gas outlet for purified or filtered gas. The openings 22 and 24 are designed for threaded connection to adjacent pipe sections (not shown) of a commercial gas line.

Figure 3:
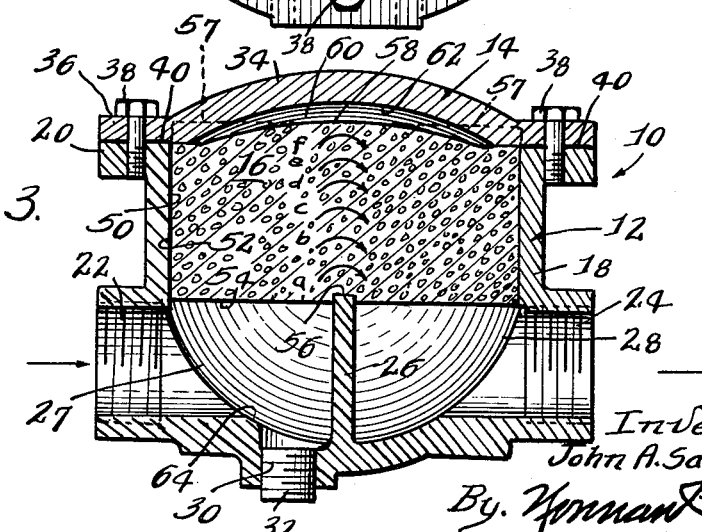

The diameter of each opening 22 and 24 is of appreciable magnitude considering the height of the bowl portion 18, and a baffle web 26 extends upwardly from the bottom of the bowl portion, as shown in FIG. 3, to a height not appreciably above the uppermost level of the openings 22 and 24. The web 26 is formed as an integral part of the casing body 12. It extends at a right angle to the common horizontal axis of the two openings 22 and 24 and is disposed substantially midway between these openings. The web 26 divides the lower regions of the interior of the casing body 12 into a gas inlet chamber 27 and a gas outlet chamber 28.

The bowl portion 18 is formed with a threaded drain opening 30 in the bottom regions thereof. Such opening is located on the gas inlet side of the baffle web 26 and is normally closed by a threaded pipe plug 32.

The removable cover plate 14 is generally of circular disk-like design and includes a shallow convexo-concave or dome-like central region 34 and a marginal annular flat rim flange 36. It serves to close the open upper part of the bowl portion 18 and is removably secured in place by clamp bolts 38. When the cover plate is in its closed position, it rim flange 36 overlies the rim flange 20 of the bowl portion 18. The bolts 38 extend through cylindrical holes in the rim flange 36 and into screw thread holes in the rim flange 20. A gasket 40 is interposed between the two rim flanges 36 and 20 in order to seal the interior of the casing body 12 from the ambient air.

The filter element 16 is in the form of a preformed body of a spongy material containing interconnected air cells of extremely small size. The material of the filter element is self-supporting in that it possesses an appreciable degree of resistance to compressional forces and, when subjected to a deforming force, it will yield, but when such forces are relieved the material will spring back to its original shape. Various grades of such a material are manufactured and sold by the Glidden Paint Company of Cleveland, Ohio, under the trade name "Polyurethane." Other grades of this material are manufactured and sold by Scott Paper Company of Chester, Pennsylvania, under the same trade name. The material is commonly referred to as "plastic foam." It has good heat insulating characteristics and is widely sold for use as ice box insulation. The thermal properties of "Polyurethane" are, however, not important to its use as a filter material.

Additional physical and chemical characteristics of "Polyurethane" which render it suitable for use as a filter material are its resistance to attack by chemical reagents, such as are commonly encountered as an adjunct to precipitation or settling out within commercial illuminating gas lines. The material is non-ferrous and, in fact, non-metallic, so that it is not subject to electrolysis, nor will the same rot when subjected to the prolonged presence of moisture. The interconnected air cells or pores of the filter material are extremely small and of uniform size so that large foreign particles will not enter or pass through the material. Finally, the material is easily sheared by a sharp cutting edge so that it may be readily cut to size and shape by a slicing operation or operations.

Referring now to FIG. 3, it will be seen that the bowl portion 18 of the casing body 12 presents a cylindrical inside wall surface 50 above the level of the baffle web 26. The filter element 16 is cut to fit this inside wall surface and, therefore, the filter element may be sliced by a single shearing operation from an elongated rod-like length of cylindrical filter stock, suitable machinery being available for effecting successive shearing of the filter elements from the advancing stock. Preferably, the filter element 16, in its free state and before it is installed within the casing body 12, is truly cylindrical and its axial extent is slightly greater than the axial extent of the cylindrical surface 50 within which it is to be telescopically received. Its diameter, however, is approximately equal to the diameter of the cylindrical surface 50 or it is so slightly in excess of such diameter that it will fit snugly within the confines of the surface 50 and can easily be inserted into and removed from the casing body. In other words, when in place within the casing body, there will be a tight frictional fit between the outer cylindrical surface 52 of the filter element 16 and the inside cylindrical surface 50 of the bowl portion 18.

The underneath planar face 54 of the filter element 16 is adapted to seat upon the upper straight linear edge 56 of the baffle web 26, as shown in FIG. 3 and, when the cover plate 14 is bolted in position on the upper open end of the bowl portion of the casing body 12, the entire body of the filter element is placed under compression, at least in a vertical direction, so that the normally planar upper face of the cylindrical filter element in its free state, and which has been shown at 57 and dotted lines in FIG. 3, will assume the full line position wherein the central portion thereof is bulged upwardly, as shown at 58, and leaves a crescent-like air space 60 between such upper face and the inside face 62 of the dome-like central region 34 of the cover plate 14.

When the underneath face 54 of the filter element 16 is seated upon the upper edge 56 of the baffle web 24, as shown in FIG. 3, the lower circular edge of the filter element lies substantially at the juncture between the cylindrical inside wall surface 50 and the semi-spherical concave bottom wall surface 64 of the bowl portion 18 of the casing body 12 and is supported by the diameter reduction offered by this portion. The upper edge 56 of the baffle web 26 and the wall surface 64 constitute the sole supporting means for the filter element 16 within the filter chamber, that is, the interior of the casing body 12.

When the gas filter 10 is put in operation, it is interposed in a gas line by threading the adjacent ends of two aligned pipe sections into the threaded inlet and outlet openings 22 and 24, respectively. With a fresh filter element 16 in place within the filter chamber, the incoming illuminating gas entering the filter chamber will encounter the baffle web 26 and be deflected upwardly so that it will enter the porous filter element 16 and, internally of the filter element, make both wide and close sweeps in arcuate paths around the upper edge 56 of the baffle web 26, following the paths schematically indicated by the arrows labelled a, b, c, d, e and f, respectively. During this initial use of the filter element 16, practically all of the interconnected internal pores within the filter material will be effective for removal of impurities from the gas. Also, during this initial use, as well as throughout the entire effective life of the filter element 16, particles of larger size entering the filter chamber will be excluded from entering the small pores and interstices of the filter material and these particles will fall to the bottom of the bowl portion 18 where they will assume an out-of-the-way position so that they will not interfere with the flow of gas through the filter. These particles may be removed from time to time by removing the plug 32 to drain them from the bowl portion 18 and, thereafter, replacing the plug.

It is to be noted at this point that with a clean fresh filter element 16, there will be paths through the filter material which offer varying resistance to gas flow. Obviously, the shorter the path which the gas may find around the baffle web 26, the less resistance there will be to the flow of gas. Therefore, initially, the shortest path for the flow of gas from the inlet opening 22 to the outlet opening 24 will be immediately around the upper edge 56 of the web where the gas makes a close sweep around this edge as indicated by the arrow a. With less resistance to flow through this path, there will be a greater volume of gas flow than through the paths b, c, d, e or f. Therefore, the portion of the filter material immediately above the edge 56 of the baffle web 26 will accumulate more foreign particles than will the remaining areas of the filter material and, as particles which are small enough to enter the filter material but which are too large to find their way through all of the interstices between the air cells or pores, collect in this region or path a, such portion of the filter material will eventually become clogged. With the path a of the filter material thus clogged, the shortest path through the filter material will be the path indicated at b and the flow of gas through the filter will continue through the paths b, c, d, e and f until the path b becomes clogged. The next areas of the filter material to become clogged will be the areas c, d, e and f, in the order named and, when the last area or path f has become clogged, a noticeable decrease of gas pressure downstream from the filter 10 will be observed and replacement of the filter element 16 will be in order. However, due to the uniform nature of the filter air cells or pores; due to the fact that the filter element 16 as a whole is not subjected to the clogging action of extremely large particles; and due to the fact that a broad area of gas entry into the filter material is at all times offered, the interval of time between filter element replacements is extremely long as compared to conventional gas filters.

When it is necessary or desirable to change the filter element 16, the procedure involved is a relatively simple one. It is merely necessary to remove the clamping bolts 38, lift off the cover plate 14, pull the filter element 16 bodily and vertically from the filter chamber, substitute a fresh filter element, and reinstall the cover plate 14.

A "Polyurethane" filter element is not subject to attack by most commercial cleaning fluids or solvents and, therefore, the element 16 may be washed in such solvents, dried, and reused in the gas filter 10 so that it is not necessary to keep a large stock of filter elements on hand.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claim is the same to be limited.

Having thus described the invention what I claim as new and desire to secure by Letters Patent is:

A gas filter comprising a casing body of upright cup-shaped configuration, having an open upper end and provided with horizontally aligned inlet and outlet openings in the bottom regions thereof, said casing body having an upper generally cylindrical wall portion and a semi-spherical bowl-shaped bottom wall portion the upper portion of which merges gradually with the cylindrical wall portion, a baffle web projecting upwardly from the bottom wall portion of said casing body midway between said openings to a height not appreciably above the uppermost level of said openings, said web dividing the lower regions of the casing body into a gas inlet chamber and a gas outlet chamber, a prefabricated cylindrical body of resilient gas-pervious filter material disposed within said casing body and supported upon the upper edge of the web coextensively therewith and upon the reduced diameter region of the bottom wall portion at its annular region of juncture with the cylindrical wall portion, said body of filter material filling the upper cylindrical wall portion of the casing body above the level of said web and presenting a flat horizontal underneath face in engagement with the upper edge of the web, said body of filter material possessing a considerable degree of resistance to compressional forces and being self-supporting upon said web and also upon the bottom wall portion at its annular region of juncture with the cylindrical wall portion, the axial extent of said cylindrical body of filter material, when in its free state, being slightly greater than the axial extent of said cylindrical wall portion, said body of filter material, in its free state, presenting a normally flat upper face, and a dome-shaped cover plate removably mounted on said casing body and closing the normally open upper end thereof, said cover plate having a flat radial rim flange engaging the upper face of said cylindrical body of filter material and serving to depress the marginal regions of said upper face to compress the body of filter material against the upper face of said baffle web and against the annular reduced diameter region of the bottom wall portion of the casing body, thus causing the medial region of the upper face to bulge upwardly, the medial region of said dome-shaped cover plate, in combination with the upwardly bulging portion of the upper face of the body of filter material defining a narrow crescent-shaped air space directly above the body of filter material.

References Cited in the file of this patent
UNITED STATES PATENTS

| | | |
|---|---|---|
| 2,231,076 | Lake et al. | Feb. 11, 1941 |
| 2,966,960 | Rochlin | Jan. 3, 1961 |
| 3,030,754 | Root et al. | Apr. 24, 1962 |